(12) United States Patent
Ide et al.

(10) Patent No.: US 10,101,095 B2
(45) Date of Patent: Oct. 16, 2018

(54) HEAT STORAGE CAPSULE AND HEAT STORAGE MEMBER USING THE SAME

(71) Applicant: Sharp Kabushiki Kaisha, Osaka-shi, Osaka (JP)

(72) Inventors: Tetsuya Ide, Osaka (JP); Yuka Utsumi, Osaka (JP); Hisanori Bessho, Osaka (JP); Tomohisa Miyatani, Osaka (JP); Tomoko Kase, Osaka (JP); Daiji Sawada, Osaka (JP); Takashi Yamashita, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 121 days.

(21) Appl. No.: 14/901,464

(22) PCT Filed: Jun. 17, 2014

(86) PCT No.: PCT/JP2014/066016
§ 371 (c)(1),
(2) Date: Dec. 28, 2015

(87) PCT Pub. No.: WO2014/208401
PCT Pub. Date: Dec. 31, 2014

(65) Prior Publication Data
US 2016/0370124 A1  Dec. 22, 2016

(30) Foreign Application Priority Data

Jun. 27, 2013 (JP) ................. 2013-134826

(51) Int. Cl.
*F28D 20/02* (2006.01)
*C09K 5/06* (2006.01)
*C09K 5/16* (2006.01)

(52) U.S. Cl.
CPC ............ *F28D 20/023* (2013.01); *C09K 5/063* (2013.01); *C09K 5/16* (2013.01); *Y02E 60/145* (2013.01)

(58) Field of Classification Search
CPC ......... F28D 20/023; C09K 5/063; C09K 5/16; Y02E 60/145
See application file for complete search history.

(56) References Cited

U.S. PATENT DOCUMENTS

| 9,080,089 | B2 * | 7/2015 | Singh | ........................ C09K 5/10 |
| 9,387,276 | B2 * | 7/2016 | Sun | .......................... A61L 27/52 |
| 2005/0019394 | A1 * | 1/2005 | Xia | ..................... C08B 37/0042 |
| | | | | 424/464 |

FOREIGN PATENT DOCUMENTS

| JP | 62-1452 A | 1/1987 |
| JP | 63-217196 A | 9/1988 |

(Continued)

OTHER PUBLICATIONS

TW201000616A machine translation.*

(Continued)

*Primary Examiner* — Len Tran
*Assistant Examiner* — Gordon Jones
(74) *Attorney, Agent, or Firm* — Keating & Bennett, LLP

(57) ABSTRACT

It is an object of the present invention to provide a heat storage capsule capable of being readily produced and a heat storage member using the same.
A heat storage capsule 10 includes a heat storage material 20 reversibly changing into a hydrate of a salt and an aqueous solution of the salt and also includes a capsule coating 22 encapsulating the heat storage material 20. The capsule coating 22 includes an inner sub-coating 24 and an outer sub-coating 26. The inner sub-coating 24 is a hydrogenated (Continued)

oil layer. The outer sub-coating 26 is made of a hydrophilic gel. The heat storage capsule 10 has a W/O/W three-layer structure.

3 Claims, 7 Drawing Sheets

(56) References Cited

FOREIGN PATENT DOCUMENTS

| | | | |
|---|---|---|---|
| JP | 63-309580 A | 12/1988 | |
| JP | 2009-108167 A | 5/2009 | |
| TW | 201000616 A * | 1/2010 | ............ B01J 13/02 |
| WO | 2009/128476 A1 | 10/2009 | |

OTHER PUBLICATIONS

JP2009108167 machine translation.*
Official Communication issued in International Patent Application No. PCT/JP2014/066016, dated Sep. 9, 2014.
Telkes, "Storage of Solar Heating/Cooling", American Society of Heating, Refrigerating and Air-Conditioning Engineers Transactions, 1974, pp. 382-392.

* cited by examiner (a)　　　　　　　　(b)

(a)

(b)

HEAT STORAGE CAPSULE AND HEAT STORAGE MEMBER USING THE SAME

TECHNICAL FIELD

The present invention relates to heat storage capsules and heat storage members including the same and particularly relates to a heat storage capsule and a heat storage member using the same.

BACKGROUND ART

Patent Literature 1 discloses a seamless heat storage capsule which includes a cover section formed from a composition containing a photocurable component and also includes a heat storage material as a content.

CITATION LIST

Patent Literature

PTL 1: International Publication No. WO 2009/128476

SUMMARY OF INVENTION

Technical Problem

However, in steps of producing the seamless heat storage capsule disclosed in Patent Literature 1, light irradiation needs to be performed in order to cure the photocurable component. Therefore, the producing steps are complicated. Patent Literature 1 discloses no information about the optimum diameter of a capsule. Patent Literature 1 discloses no method for packing the seamless heat storage capsule. Patent Literature 1 discloses no measures against the change in volume of the heat storage material during the phase change thereof.

It is an object of the present invention to provide a heat storage capsule capable of being readily produced and a heat storage member using the same.

Solution to Problem

In order to achieve the above object, according to an embodiment of the present invention,
a heat storage capsule may include a heat storage material reversibly changing into a hydrate of a salt and an aqueous solution of the salt and a capsule coating encapsulating the heat storage material.

In the heat storage capsule,
the capsule coating may have an inside diameter of about 1 mm to about 15 mm.

In the heat storage capsule,
the capsule coating may include an inner sub-coating covering the heat storage material and an outer sub-coating covering the inner sub-coating.

In the heat storage capsule,
the inner sub-coating may be a hydrogenated oil layer and the outer sub-coating may be made of a calcium alginate gel.

In the heat storage capsule,
the capsule coating may be made of a calcium alginate gel.

In the heat storage capsule,
the salt may be sodium sulfate, disodium hydrogen phosphate, sodium thiosulfate, sodium acetate, or calcium chloride.

In order to achieve the above object, according to an embodiment of the present invention,
a heat storage member may include a container and a plurality of heat storage capsules, according to the present invention, filled in the container.

In order to achieve the above object, according to an embodiment of the present invention,
a heat storage member may include a container;
a paraffin filled in the container;
and a plurality of heat storage capsules, according to the present invention, dispersed in the paraffin.

Advantageous Effects of Invention

According to the present invention, a heat storage capsule capable of being readily produced and a heat storage member using the same can be achieved.

DESCRIPTION OF EMBODIMENTS

First Embodiment

A heat storage capsule 10 according to a first embodiment of the present invention is described with reference to FIGS. 1 to 5. In all figures below, for convenience of description, components are shown in different sizes or proportions.

Figure 1:
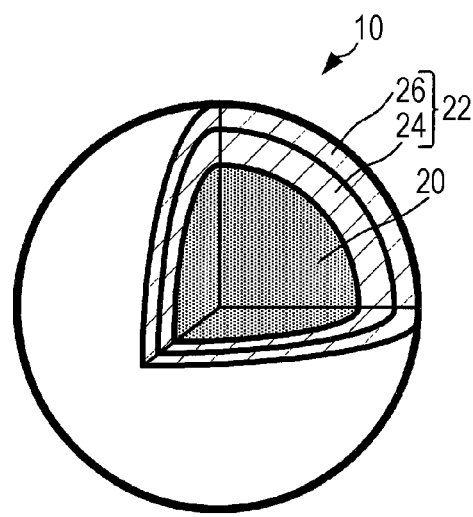
FIG. 1 is a schematic view of a heat storage capsule 10 according to a first embodiment of the present invention.

FIG. 1 is a schematic view of the heat storage capsule 10 according to this embodiment. FIG. 1 shows a content and a capsule coating 22 of the heat storage capsule 10 in cross section in such a state that a portion (one-eighth) of the capsule coating 22 is removed. The heat storage capsule 10 includes a heat storage material 20 as a filler.

In this embodiment, a hydrate of a salt is used for the heat storage material 20. Examples of the hydrate, which is used for the heat storage material 20, include sodium sulfate decahydrate (Na$_2$SO$_4$·10H$_2$O), disodium hydrogen phosphate dodecahydrate (Na$_2$HPO$_4$·12H$_2$O), sodium thiosulfate tetrahydrate (Na$_2$S$_2$O$_3$·5H$_2$O), sodium acetate trihydrate (CH$_3$COONa·3H$_2$O), and calcium chloride hexahydrate (CaCl$_2$·6H$_2$O).

The hydrate is safe and inexpensive and has high latent heat. Sodium sulfate decahydrate has a latent heat of 251 kJ/kg. Disodium hydrogen phosphate dodecahydrate has a latent heat of 281 kJ/kg. Sodium thiosulfate tetrahydrate has a latent heat of 197 kJ/kg. Sodium acetate trihydrate has a latent heat of 264 kJ/kg. Calcium chloride hexahydrate has a latent heat of 192 kJ/kg. Herein, the latent heat of the hydrate is the quantity of heat absorbed when the hydrate melts incongruently to decompose into an anhydrous salt and an aqueous solution.

The peritectic point at which an aqueous solution of a salt changes into a hydrate of the salt is higher than 0° C. The peritectic point of sodium sulfate decahydrate is 32.4° C. The peritectic point of disodium hydrogen phosphate dodecahydrate is 35.2° C. The peritectic point of sodium thiosulfate tetrahydrate is 48.5° C. The peritectic point of sodium acetate trihydrate is 58° C. The peritectic point of calcium chloride hexahydrate is 29.8° C.

The decomposition melting point (incongruent melting point) at which a hydrate of salt decomposes into an anhydrate and an aqueous solution substantially agrees with the peritectic point. The heat storage material 20, for which the hydrate of the salt is used, is liquid at a temperature not lower than the decomposition melting point and is solid at a temperature not higher than the peritectic point. The decomposition melting point of the hydrate can be adjusted using a melting point adjustor. The hydrate has a decomposition melting point of higher than 0° C. When the hydrate reaches the decomposition melting point thereof, the hydrate melts incongruently to absorb heat equivalent to the latent heat. Therefore, the hydrate can be used for heat storage materials, used in a temperature range not lower than 0° C., impossible for water or an aqueous solution of an inorganic salt to cope with.

The heat storage capsule 10 includes the capsule coating 22. The capsule coating 22 encapsulates the heat storage material 20. The capsule coating 22 includes an inner sub-coating 24 covering the heat storage material 20 and an outer sub-coating 26 covering the inner sub-coating 24. The inner sub-coating 24 is a hydrogenated oil layer made of hydrophobic hydrogenated oil. The outer sub-coating 26 is made of gelatin or starch which is gelled (solidified) by cooing. Gelatin and starch are water-soluble gels. Alternatively, the outer sub-coating 26 may be made of a hydrophobic calcium alginate gel.

As described above, in this embodiment, the heat storage capsule 10 is spherical and has a three-layer structure (W/O/W) consisting of the heat storage material 20 (water-soluble), the inner sub-coating 24 (hydrophobic), and the outer sub-coating 26 (water-soluble). Since the heat storage capsule 10 includes the inner sub-coating 24, the heat storage capsule 10 can prevent the migration of water from the heat storage material 20 to the outer sub-coating 26 and therefore can prevent the dissolution of the outer sub-coating 26. This allows the heat storage capsule 10 to have improved capsule strength and enables the heat storage capsule 10 to be stably used for a long period of time.

By the way, during the incongruent melting (decomposition melting) of the hydrate, a lower hydrate and an anhydride are partly deposited. Therefore, in the case where the hydrate is sealed in, for example, a cylindrical container, the lower hydrate and the anhydride precipitate on the bottom of the container during the incongruent melting of the hydrate. If the hydrate in the container repeatedly melts incongruently, then a layer of the aqueous solution, a layer of the lower hydrate, and a layer of the hydrate are formed in the container in that order from the top. In the case where the temperature in the container is reduced to a temperature not higher than the peritectic point of the hydrate from this state, a hydration reaction starts. The hydration reaction, in which the lower hydrate and the anhydride change into a higher hydrate, proceeds in a solid state and therefore has a low rate; hence, before the hydration reaction is completed, a deposition layer of the higher hydrate is formed on the lower hydrate and the anhydride. After the deposition layer of the higher hydrate is formed, the migration of water from the aqueous solution to the lower hydrate is prevented and therefore the lower hydrate cannot change into the higher hydrate. Therefore, before all the hydrate and the lower hydrate change into the higher hydrate, the hydration reaction is terminated. After the termination of the hydration reaction, in the container, a layer of a saturated aqueous solution, a layer of the higher hydrate, a layer of the lower hydrate, and a layer of the anhydride are formed in that order from the top, that is, phase separation occurs. The occurrence of phase separation reduces the latent heat of the heat storage material. Therefore, in the case where the hydrate is used for the heat storage material, there is a problem in that the repetitive use of the heat storage material reduces the latent heat of the heat storage material (deteriorates heat storage properties).

In order to prevent the phase separation of the heat storage material, the viscosity of the heat storage material is increased by adding a thickening agent thereto as well known. The thickening agent used is CMC-Na (carboxymethylcellulose), sepiolite, or the like. In order to prevent the precipitation of the lower hydrate and the anhydride, the concentration of the thickening agent needs to be high, 5% to 10% by weight. In this case, it is difficult to evenly mix the thickening agent with the heat storage material. Furthermore, it is difficult to pack or handle the heat storage material having high viscosity.

It has been reported that the phase separation caused by the repetitive incongruent melting of a hydrate of a salt can be improved by adjusting a reaction space to ¼ inch (about 6 mm) in the gravitational direction when the interface between an aqueous solution and anhydride after incongruent melting is flat (Maria Telkes, STORAGE OF SOLAR HEATING/COOLING, American Society of Heating, Refrigerating and Air-Conditioning Engineers Transactions (ASHRAE Transactions), (United States), American Society of Heating, Refrigerating and Air-Conditioning Engineers, 1974, pp. 382-392).

The principle of improving the phase separation caused by the repetitive incongruent melting of the hydrate is described using sodium sulfate decahydrate as an example. After the incongruent melting of sodium sulfate decahydrate, 16% by weight of anhydrous sodium sulfate precipitates. Supposing that the density of water is 1 and the density of anhydrous sodium sulfate is 1.5, the volume of anhydrous sodium sulfate after incongruent melting is 10.7% of the whole. This value is given by the quotient of the mass percentage (16% by weight) of anhydrous sodium sulfate after incongruent melting in the whole and the density (1.5) of anhydrous sodium sulfate. The volume of deposited anhydrous sodium sulfate is determined using this value.

In the case where sodium sulfate decahydrate is sealed in, for example, a cuboid-shaped container with an inside length of 100 mm, an inside width of 100 mm, and an inside height of 6 mm such that the container is substantially filled with sodium sulfate decahydrate, the volume of anhydrous sodium sulfate after incongruent melting is given by the product of the volume of the container and the percentage of the volume of anhydrous sodium sulfate after incongruent melting. Since the volume of the container is 60,000 mm$^2$, the volume of anhydrous sodium sulfate is given as follows: 60,000 (mm$^2$)×10.7(%)=6,420 (mm$^2$). In the container, the ratio of the contact area between anhydrous sodium sulfate and water to the volume of anhydrous sodium sulfate is 10,000:6,420. The value of this ratio is about 1.6. As the ratio of the contact area between anhydrous sodium sulfate and water to the volume of anhydrous sodium sulfate is larger, the hydration reaction is more likely to proceed and phase separation is more unlikely to occur. Therefore, when the value of the ratio of (the volume of anhydrous sodium sulfate in the container) to (the contact area between anhydrous sodium sulfate and water) is about 1.6 or more, the phase separation caused by the repetitive incongruent melting of a hydrate of a salt can probably be prevented.

The phase separation caused by the repetitive incongruent melting of the hydrate of the salt is improved in such a manner that the hydrate of the salt is sealed in a container with an inside height of about 6 mm. However, such a container with an inside height of about 6 mm in the gravitational direction can be placed only on a top plate or a bottom plate.

On the other hand, in the case where a hydrate of a salt is sealed in the heat storage capsule 10 according to this embodiment, the interface between an aqueous solution and anhydride after incongruent melting is curved. Supposing that in the case where sodium sulfate decahydrate is sealed in a spherical capsule, anhydrous sodium sulfate is deposited on the lower half of an inner coating of the capsule. In the case where sodium sulfate decahydrate is sealed in a spherical capsule including an inner coating with an inside diameter of 5.00 mm, the volume of anhydrous sodium sulfate after incongruent melting is determined by multiplying the internal volume of the inner coating of the capsule by 10.7%, which is the percentage of the volume of anhydrous sodium sulfate after incongruent melting, as given by the following equation:

$$4/3 \times \pi \times 2.50^3 \times 0.107 = 7.00 \qquad (1).$$

Accordingly, the volume of anhydrous sodium sulfate is 7.00 mm$^3$.

The radius of a sphere with a volume that is 7.00 mm$^3$ less than the internal volume of the inner coating of the capsule is about 2.41 mm, wherein 7.00 mm$^3$ is the volume of anhydrous sodium sulfate. Therefore, the thickness of a layer of anhydrous sodium sulfate is 0.09 mm. This value is used to determine the contact area between anhydrous sodium sulfate and water. Since anhydrous sodium sulfate is supposed to be deposited on the lower half of the inner coating of the capsule, the contact area between anhydrous sodium sulfate and water is determined by the following equation, which is used to determine the surface area of a hemisphere with a radius of 2.41 mm:

$$4 \times \pi \times 2.41^2 / 2 = 36.5 \qquad (2).$$

Accordingly, the contact area between anhydrous sodium sulfate and water is 36.5 m$^2$.

From the above, in the spherical capsule including the inner coating with an inside diameter of 5.00 mm, the ratio of the contact area between anhydrous sodium sulfate and water to the volume of anhydrous sodium sulfate is 36.5:7.00. The value of this ratio is about 5.2. Since the value of this ratio is greater than 1.6, the spherical capsule including the inner coating with an inside diameter of 5.00 mm can prevent the phase separation caused by the repetitive incongruent melting of a hydrate of a salt.

The case where sodium sulfate decahydrate is sealed in a spherical capsule including an inner coating with an inside diameter of 15.0 mm is described below. The volume of anhydrous sodium sulfate after incongruent melting is determined by multiplying the internal volume of the inner coating of the capsule by 10.7%, which is the percentage of the volume of anhydrous sodium sulfate after incongruent melting, as given by the following equation:

$$4/3 \times \pi \times 7.50^3 \times 0.107 = 189 \qquad (3).$$

Accordingly, the volume of anhydrous sodium sulfate is 189 mm$^3$.

The radius of a sphere with a volume that is 189 mm$^3$ less than the internal volume of the inner coating of the capsule is about 7.22 mm, wherein 189 mm$^3$ is the volume of anhydrous sodium sulfate. Therefore, the thickness of a layer of anhydrous sodium sulfate is 0.28 mm. This value is used to determine the contact area between anhydrous sodium sulfate and water. Since anhydrous sodium sulfate is supposed to be deposited on the lower half of the inner coating of the capsule, the contact area between anhydrous sodium sulfate and water is determined by the following equation, which is used to determine the surface area of a hemisphere with a radius of 7.22 mm:

$$4 \times \pi \times 7.22^2 / 2 = 327 \qquad (4).$$

Accordingly, the contact area between anhydrous sodium sulfate and water is 327 m$^2$.

From the above, in the spherical capsule including the inner coating with an inside diameter of 15.0 mm, the ratio of the contact area between anhydrous sodium sulfate and water to the volume of anhydrous sodium sulfate is 327:189. The value of this ratio is about 1.7. Since the value of this ratio is greater than 1.6, the spherical capsule including the inner coating with an inside diameter of 15.0 mm can prevent the phase separation caused by the repetitive incongruent melting of a hydrate of a salt.

In this embodiment, the hydrate is sealed in the heat storage capsule 10, which is spherical. From the above results, in order to prevent the phase separation caused by the repetitive incongruent melting of the hydrate of the salt, the capsule coating 22 of the heat storage capsule 10 preferably has an inside diameter of about 15 mm or less. When the inside diameter of the capsule coating 22 is about 15 mm or less, the heat storage capsule 10 can prevent the phase separation. In order to evenly seal the hydrate in a plurality of heat storage capsules 10, the inside diameter of the capsule coating 22 of the heat storage capsule 10 is preferably 10 times or more (about 1 mm or more) of the average particle size (50 μm to 100 μm) of the salt.

Figure 2:
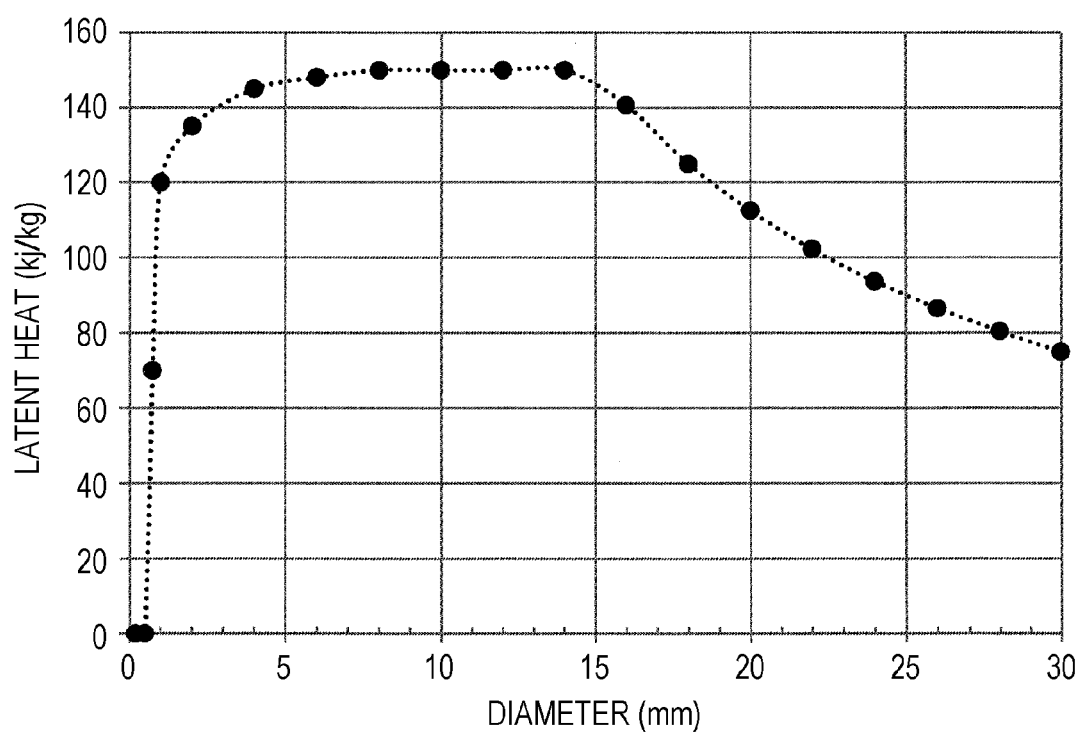
FIG. 2 is a graph showing the relationship between the diameter and latent heat of the heat storage capsule 10 according to the first embodiment of the present invention.

FIG. 2 is a graph showing the relationship between the diameter and latent heat of the heat storage capsule 10, in which sodium sulfate decahydrate is used for the heat storage material 20. The horizontal axis represents the diameter (mm) of the heat storage capsule 10 and the vertical axis represents the latent heat (kj/kg) of the heat storage capsule 10. In FIG. 2, solid circles (●) show the data of the latent heat of the heat storage capsule 10 at each diameter. In FIG. 2, the solid circles (●) are connected to each other with a dotted curved line. The latent heat of the heat storage capsule 10 is determined at each diameter by a temperature history method.

As shown in FIG. 2, when the diameter of the heat storage capsule 10 is less than 1 mm, the latent heat decreases sharply. This is probably because when the diameter of the heat storage capsule 10 is less than 1 mm, a reaction space is small and therefore a solid phase (sodium sulfate decahydrate) is unlikely to be deposited during the liquid-to-solid phase change of the heat storage material 20. The reason why the latent heat decreases when the diameter of the heat storage capsule 10 is 15 mm or more is probably that the thickness of a layer of anhydrous sodium sulfate in the capsule is large, the reaction of the heat storage material 20 from a solid phase to a solid phase is not completed, and therefore the amount of sodium sulfate decahydrate capable of contributing to phase change decreases. When the heat storage capsule 10 has a diameter of 1 mm to 15 mm, the heat storage capsule 10 has relatively high latent heat. In order to obtain relatively high latent heat, the diameter of the heat storage capsule 10 is preferably 1 mm to 15 mm.

Figure 3:
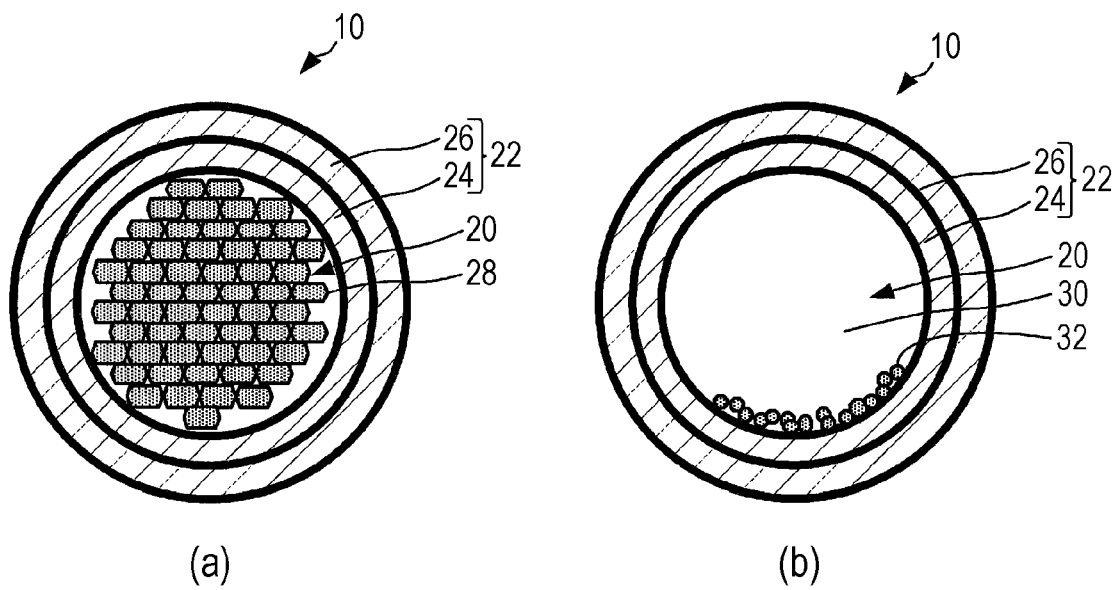
FIG. 3 is a sectional view of the heat storage capsule 10 according to the first embodiment of the present invention.

FIG. 3 is a sectional view of the heat storage capsule 10. FIG. 3(a) shows a state in which the heat storage material 20 is a hydrate. In FIG. 3(a), crystals 28 of the hydrate in the heat storage capsule 10 are schematically shown with hexagons. When the temperature in the heat storage capsule 10 reaches a temperature not lower than the decomposition melting point thereof in the state shown in FIG. 3(a), the decomposition reaction (incongruent melting) of the hydrate starts. When the hydrate is decomposed, the heat storage material 20 is decomposed into an aqueous solution of a salt and a lower hydrate or an anhydride (salt).

FIG. 3(b) shows a state in which the heat storage material 20 is decomposed into the aqueous solution 30 of the salt and the lower hydrate or the anhydride 32. In FIG. 3(b), the lower hydrate or the anhydride 32 is schematically shown with an octagon. As described above, when a reaction space during the decomposition of the hydrate is about 15 mm or less, phase separation does not occur. Therefore, in the case where the temperature in the heat storage capsule 10 is reduced to a temperature not higher than the peritectic point in a state shown in FIG. 3(b), the aqueous solution 30 reacts with the lower hydrate and the anhydride 32 to produce the hydrate (higher hydrate) and the heat storage capsule 10 enters the state shown in FIG. 3(a). As described above, the heat storage material 20 reversibly changes into the hydrate of the salt and the aqueous solution of the salt.

Figure 4:
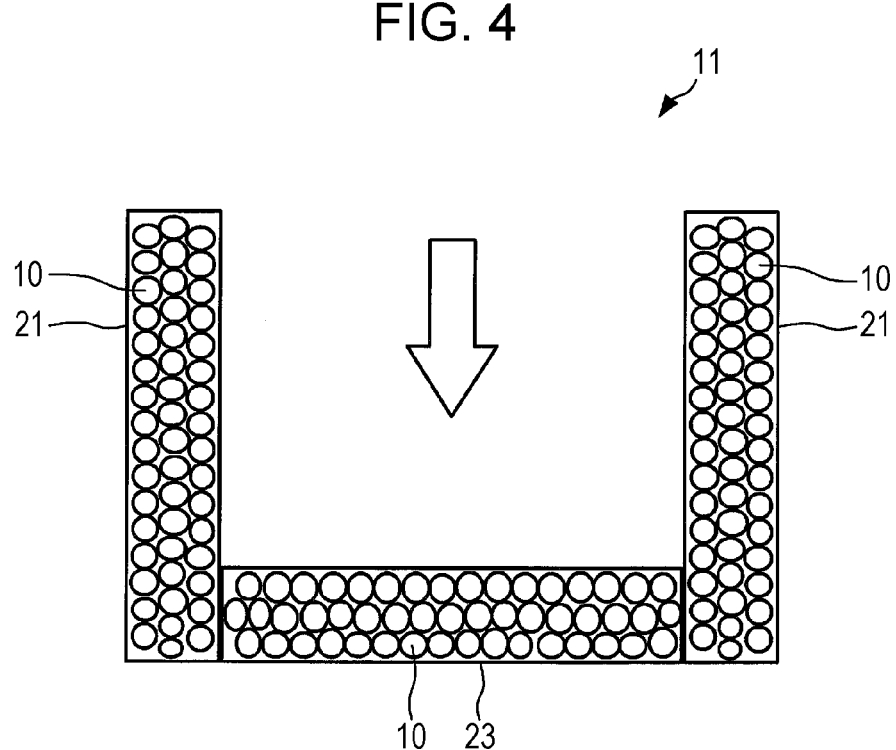
FIG. 4 is an illustration of a heat storage member 11 using the heat storage capsule 10 according to the first embodiment of the present invention.

FIG. 4 shows a heat storage member 11 using the heat storage capsule 10 according to this embodiment. The heat storage member 11 includes containers 21 and 23 and a plurality of the heat storage capsules 10. In FIG. 4, an open arrow indicates the gravitational direction in such a state that the heat storage member 11 is placed. The containers 21 and 23 have a cuboid shape. In an example shown in FIG. 4, the two containers 21 are placed opposite to each other so as to extend in a vertical direction in such a state that the heat storage member 11 is placed. The container 23 is placed between the two containers 21 so as to extend in a horizontal direction in such a state that the heat storage member 11 is placed.

The containers 21 and 23 are filled with a plurality of the heat storage capsules 10. In the heat storage member 11, since the heat storage material 20 is sealed in each heat storage capsule 10, a reaction space for the hydrate can be adjusted to about 15 mm or less. Therefore, the inside size of the heat storage member 11 need not be adjusted to 6 mm or less in the gravitational direction in such a state that the containers 21 are placed. Accordingly, the heat storage member 11 can be exempted from restrictions on placement in the gravitational direction.

The heat storage material 20 is encapsulated in the heat storage capsule 10. The heat storage capsule 10 is easier to handle as compared to heat storage materials with high viscosity. The heat storage capsule 10 according to this embodiment is easy to handle and is readily sealed in the containers 21 and 23.

Figure 5:
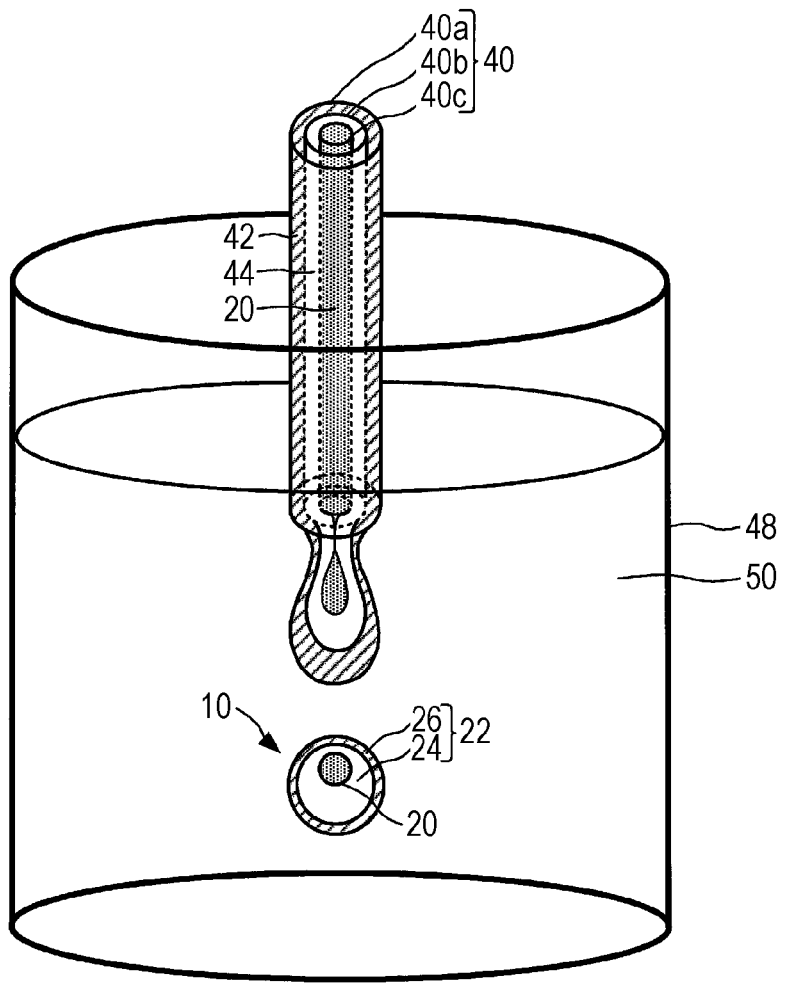
FIG. 5 is a schematic view showing a method for producing the heat storage capsule 10 according to the first embodiment of the present invention.

A method for producing the heat storage capsule 10 according to this embodiment is described below with reference to FIG. 5. FIG. 5 schematically shows the method for producing the heat storage capsule 10. The heat storage capsule 10 according to this embodiment is produced by an in-liquid dropping method.

In an in-liquid dropping method for producing a capsule with a three-layer structure, a material for the heat storage capsule 10 is dropped into liquid using a triple nozzle 40 as shown in FIG. 5. The triple nozzle 40 includes three sub-nozzles 40a, 40b, and 40c. The sub-nozzles 40a, 40b, and 40c have a cylindrical shape.

The sub-nozzle 40a is outermost among the three sub-nozzles of the triple nozzle 40. The sub-nozzle 40b is smaller in diameter than the sub-nozzle 40a and is placed inside the sub-nozzle 40a. The sub-nozzle 40c is smaller in diameter than the sub-nozzle 40b and is placed inside the sub-nozzle 40b. The sub-nozzles 40a, 40b, and 40c are concentrically arranged.

An end of the triple nozzle 40 is immersed in a cooling liquid 50 in a preparation vessel 48. The preparation vessel 48 has a columnar shape and has an open bottom. In this embodiment, the outer sub-coating 26 of the heat storage capsule 10 is made of gelatin or starch, which is hydrophilic, and therefore the cooling liquid 50 used is a hydrophobic liquid.

The sub-nozzle 40a is used to drop an outer coating liquid 42 which is a material for the outer sub-coating 26. The outer coating liquid 42 is gelatin or starch liquefied by heating. The sub-nozzle 40b is used to drop an inner coating liquid 44 used to form the inner sub-coating 24. The sub-nozzle 40c is used to drop the heat storage material 20 which is in a state of the aqueous solution of the salt.

In the case where the outer coating liquid 42, the inner coating liquid 44, and the heat storage material 20 are ejected into the cooling liquid 50 using the triple nozzle 40 at the same time, the outer coating liquid 42 forms a sphere due to interfacial tension so as to cover the inner coating liquid 44 and the heat storage material 20 because the outer coating liquid 42, which is outside, is hydrophilic and the cooling liquid 50 is hydrophobic. The outer coating liquid 42 is gelled (solidified) by cooing, whereby the outer sub-coating 26 is formed. This allows the heat storage capsule 10, which has the three-layer structure, to be produced.

Since the inside diameter of the capsule coating 22 is about 15 mm or less, the heat storage capsule 10 according to this embodiment can prevent the phase separation caused by the repetitive incongruent melting of the hydrate of the salt.

The hydrate of the salt has an increased volume in a liquid state after incongruent melting. Therefore, the heat storage capsule 20, which is produced in such a state that the heat storage material 20 for which the hydrate of the salt is used is in a liquid phase and has relatively low density, can prevent capsule breakage due to the expansion of the heat storage material 20 during phase change. The heat storage material 20 in a liquid phase is in such a state that water and an anhydrous salt are present. In the case where the heat storage material 20 which is in such a state that the anhydrous salt is agitated in an aqueous solution is sealed in the heat storage capsule 10, the breakage of the capsule coating 22 can be prevented without providing an air layer in the capsule. The heat storage capsule 10 according to this embodiment can cope with a change in volume when the heat storage material 20 changes from solid to liquid.

Second Embodiment

A heat storage capsule 12 according to a second embodiment of the present invention is described below with reference to FIGS. 6 to 9. Components having the same function and action as those described in the first embodiment are given the same reference numerals and will not be described in detail. The heat storage capsule 12 according to this embodiment features a two-layer structure (O/W).

Figure 6:
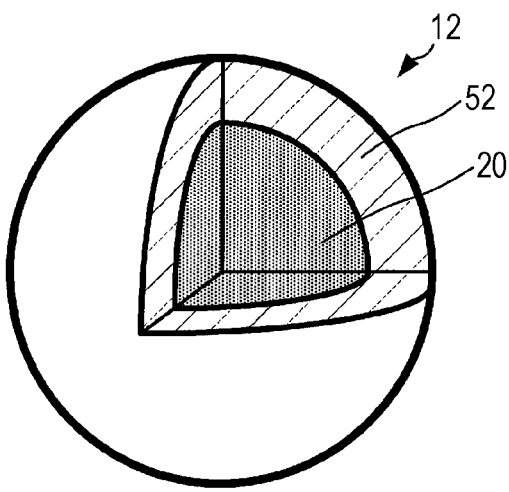
FIG. 6 is a schematic view of a heat storage capsule 12 according to a second embodiment of the present invention.

As shown in FIG. 6, the heat storage capsule 12 has a spherical shape. The heat storage capsule 12 includes a heat storage material 20 as a content and a capsule coating (outer coating) 52. The capsule coating 52 is made of a calcium alginate gel. Since the calcium alginate gel is hydrophobic, the capsule coating 52 is not dissolved in water contained in the heat storage material 20.

The capsule coating 52 of the heat storage capsule 12 has an inside diameter of about 15 mm or less. Therefore, the heat storage capsule 12 according to this embodiment can prevent the phase separation caused by the repetitive incongruent melting of a hydrate of a salt. In order to evenly seal the hydrate in a plurality of heat storage capsules 12, the inside diameter of the capsule coating 52 of the heat storage capsule 12 is preferably 10 times or more (about 1 mm or more) of the average particle size (50 μm to 100 μm) of the salt.

Figure 7:
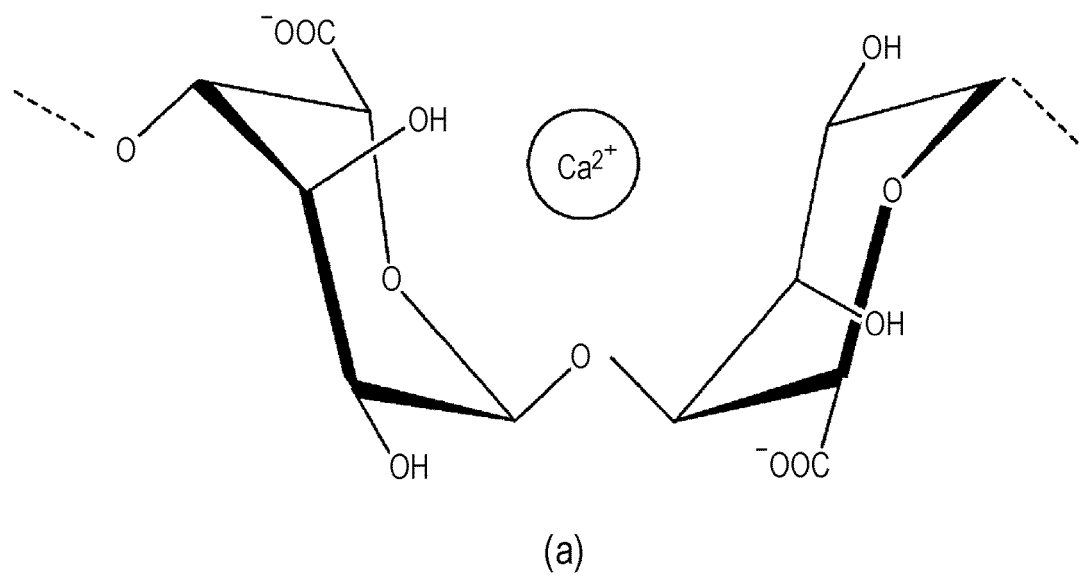
FIG. 7 is an illustration showing a calcium alginate gel used for a capsule coating 52 of the heat storage capsule 12 according to the second embodiment of the present invention.
Figure 7:
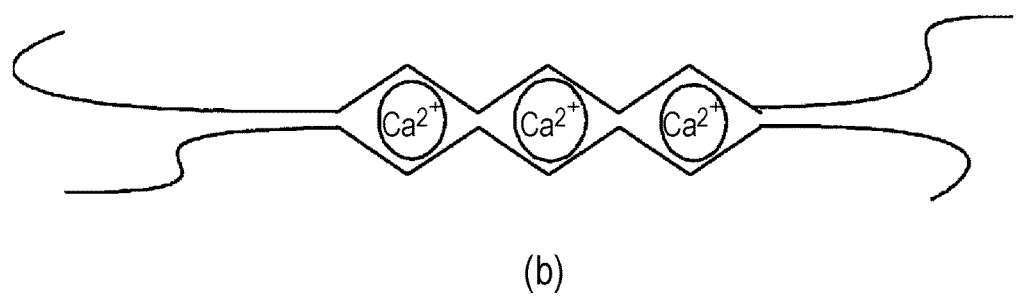

FIG. 7 shows a state in which alginic acid and calcium ions ($Ca^{2+}$) which are divalent ions form gel. In the case where alginic acid is dropped into an aqueous solution containing calcium ions, alginic acid surrounds the calcium ions as shown in FIG. 7(a), whereby an egg box structure is formed as shown in FIG. 7(b). This allows the calcium alginate gel, which is insoluble in water, to be formed.

Figure 8:
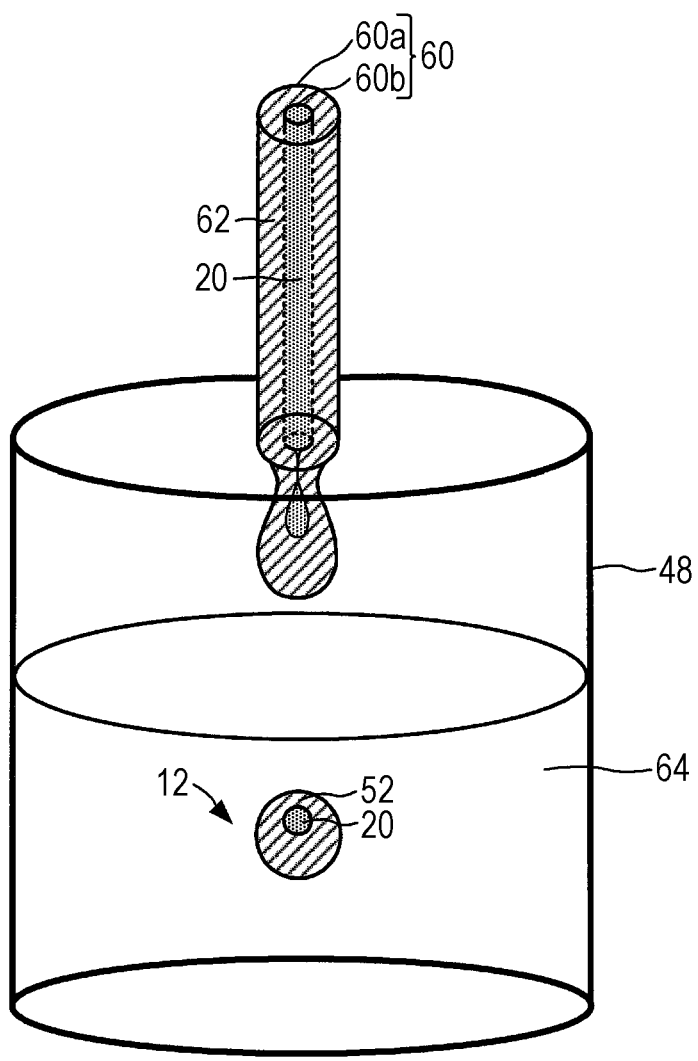
FIG. 8 is a schematic view showing a method for producing the heat storage capsule 12 according to the second embodiment of the present invention.

A method for producing the heat storage capsule 12 according to this embodiment is described below with reference to FIG. 8. FIG. 8 schematically shows the method for producing the heat storage capsule 12. The heat storage capsule 12 according to this embodiment is produced by an in-liquid dropping method.

In an in-liquid dropping method for producing a capsule with a two-layer structure, a material for the heat storage capsule 12 is dropped into liquid using a double nozzle 60 as shown in FIG. 8. The double nozzle 60 includes two sub-nozzles 60a and 60b. The s sub-nozzles 60a and 60b have a cylindrical shape.

The sub-nozzle 60a is placed outside the double nozzle 60. The sub-nozzle 60b is smaller in diameter than the sub-nozzle 60a and is placed inside the sub-nozzle 60a. The sub-nozzles 60a and 60b are concentrically arranged. The sub-nozzle 60a is used to drop an outer coating liquid 62 which is a material for the capsule coating 52. The sub-nozzle 60b is used to drop the heat storage material 20 which is in a state of an aqueous solution of a salt.

In this embodiment, the capsule coating 52 is made of the calcium alginate gel. An aqueous solution of sodium alginate is used for the outer coating liquid 62, which is a material for the capsule coating 52.

In the case where the outer coating liquid 62 and the heat storage material 20 are ejected into an aqueous calcium chloride solution 64 (a calcium chloride concentration of 1% by weight) in the preparation vessel 48 using the triple nozzle 40 at the same time, the calcium alginate gel is formed from alginic acid in the outer coating liquid 62 and calcium ions in the aqueous calcium chloride solution 64. Calcium alginate is insoluble in water. Therefore, the capsule coating 52 forms a sphere due to interfacial tension such that the heat storage material 20 is covered in the aqueous calcium chloride solution 64. This allows the capsule coating 52 to be formed, thereby producing the heat storage capsule 12, which has the two-layer structure.

Figure 9:
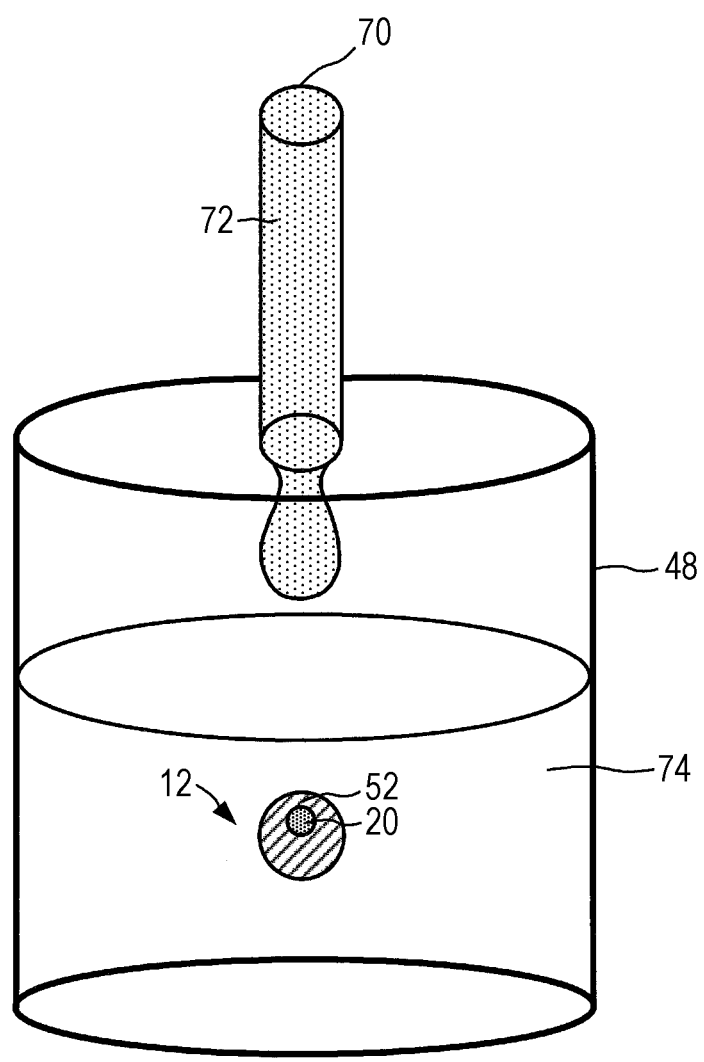
FIG. 9 is a schematic view showing a modification of the method for producing the heat storage capsule 12 according to the second embodiment of the present invention.

A modification of the method for producing the heat storage capsule 12 according to this embodiment is described below with reference to FIG. 9. In this modification, calcium chloride tetrahydrate is used for the heat storage material 20 of the heat storage capsule 12. This modification is characterized in that a single nozzle 70 rather than a multiple nozzle is used to produce the heat storage capsule by the in-liquid dropping method.

The single nozzle 70 has a cylindrical shape. In the case where an aqueous calcium chloride solution 72 is ejected into an aqueous sodium alginate solution 74 in the preparation vessel 48 using the single nozzle 70, the calcium alginate gel is formed from alginic acid in the aqueous sodium alginate solution 74 and calcium ions in the aqueous calcium chloride solution 72. Calcium alginate is insoluble in water. Therefore, the capsule coating 52 forms a sphere due to interfacial tension so as to cover the aqueous calcium chloride solution 72, which is used to form the heat storage material 20. This allows the capsule coating 52 to be formed, thereby producing the heat storage capsule 12, which has the two-layer structure.

In this modification, the aqueous calcium chloride solution is dropped into the aqueous sodium alginate solution 74. The aqueous calcium chloride solution may be dropped into an aqueous solution of methoxyl pectin. In this case, the capsule coating 52 is made of a methoxyl pectin gel. Methoxyl pectin used is low-methoxyl pectin (LM pectin) with a methoxyl content of 7% or less. Methoxyl pectin forms an egg box structure together with divalent cations such as calcium ions ($Ca^{2+}$) to gel. The methoxyl pectin gel is insoluble in water. Therefore, when the capsule coating 52 is made of the methoxyl pectin gel, the capsule coating 52 is not dissolved in water in the hydrate of the salt and can hold the hydrate of the salt therein.

Since the inside diameter of the capsule coating 52 is about 15 mm or less, the heat storage capsule 12 according to this embodiment can prevent the phase separation caused by the repetitive incongruent melting of the hydrate of the salt. The heat storage capsule 12 according to this embodiment, as well as the heat storage capsule 10 according to the first embodiment, can cope with a change in volume when the heat storage material 20 changes from solid to liquid.

Third Embodiment

A heat storage member 15, using a heat storage capsule 10, according to a third embodiment of the present invention is described below with reference to FIGS. 10 to 11. Components having the same function and action as those described in the first embodiment are given the same reference numerals and will not be described in detail.

In this embodiment, the heat storage member 15 uses a plurality of heat storage capsules 10 according to the first embodiment. The heat storage capsules 10 have a capsule surface (outer sub-coating surface) modified to be oleophilic using a surfactant. The heat storage member 15 is prepared in such a manner that the heat storage capsules 10, which are oleophilic, are dispersed in a paraffin gel.

Figure 10:
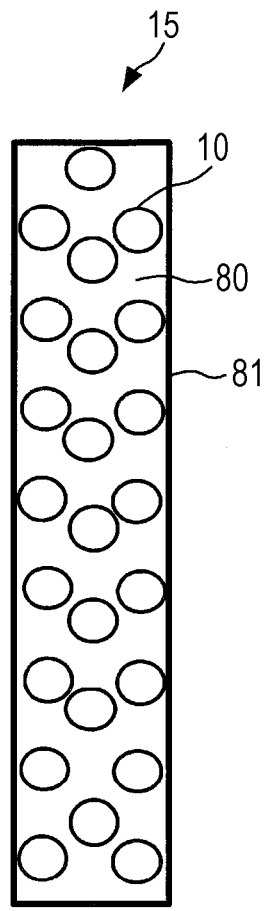
FIG. 10 is an illustration showing the configuration of a heat storage member 15 according to a third embodiment of the present invention.
Figure 11:
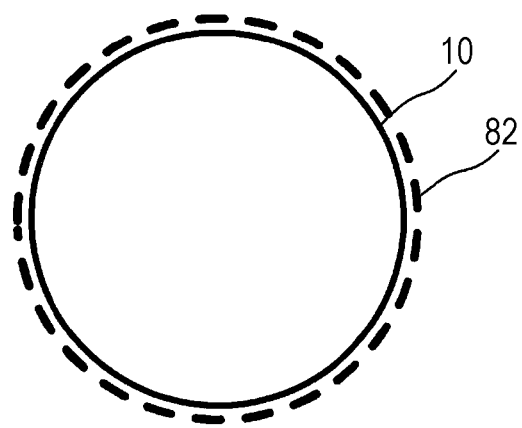
FIG. 11 is a schematic view showing heat storage capsules 10 dispersed in a paraffin 80 of the heat storage member 15 according to the third embodiment of the present invention.

FIG. 10 is an illustration showing the configuration of the heat storage member 15 according to this embodiment. The heat storage member 15 includes a container 81, a paraffin 80 filled in the container 81, and the heat storage capsules 10 dispersed in the paraffin 80. The container 81 has a cuboid shape. The container 81 is filled with a gelled paraffin with low viscosity.

The heat storage capsules 10 are dispersed in the paraffin 80. FIG. 11 shows the heat storage capsules 10 dispersed in the paraffin 80. As shown in FIG. 11, each heat storage capsule 10 is covered with an oleophilic portion 82 of the surfactant and is oleophilic. Therefore, the heat storage capsules 10, which are each covered with the hydrophilic capsule coating (outer sub-coating), can be dispersed in the paraffin 80. In a W/O emulsion prepared by dispersing the heat storage capsules 10 in the paraffin 80, the HLB value is 6 to 9 and therefore a nonionic surfactant such as sorbitan monolaurate is suitable as a surfactant.

Since the heat storage capsules 10 are dispersed in the paraffin 80, the heat storage member 15 according to this embodiment can prevent water from leaking from the heat storage capsules 10. Therefore, the heat storage member 15 according to this embodiment can prevent the drying of the heat storage capsules 10. This allows the strength of the outer sub-coatings of the heat storage capsules 10 to be maintained; hence, the leakage of the heat storage material, which is a content, can be prevented. Since the heat storage capsules 10 contain water and are dispersed in the paraffin 80, the heat storage member 15 according to this embodiment can prevent the burning of the paraffin 80. When the temperature of the solid-to-liquid phase change of the paraffin 80 is substantially equal to the decomposition melting point of the heat storage material in the heat storage capsules 10, the latent heat equal to the sum of the latent heat of the paraffin and the latent heat of the heat storage material, which uses a hydrate, can be obtained at this temperature.

The present invention is not limited to the above embodiments and various modifications can be made. In the third embodiment, an example in which the heat storage capsules 10, which includes the hydrophilic outer sub-coatings, are dispersed in the paraffin 80 is cited. The present invention is not limited to this example. For example, heat storage capsules 12, including an oleophilic (hydrophobic) outer coating, according to the second embodiment may be dispersed in the paraffin 80. In this case, the heat storage capsules 12 are oleophilic and therefore no surfactant is necessary.

A double-network gel may be used for the outer sub-coating 26 of the heat storage capsule 10. The double-network gel has an interpenetrating polymer network structure in which different network structures are physically intertwined with each other through a mesh and has high strength (high toughness). In the case of using the double-network gel for the outer sub-coating 26, the following solution is used for the outer coating liquid 42 in order to form a first network gel: an aqueous solution in which 2 mol/L of a 2-acrylamido-2-methylpropanesulfonic acid monomer (a molecular weight of 229.23), 0.2 mol/L of N,N'-methylene-bis(acrylamide) (a molecular weight of 154.17) as a crosslinking agent, and 0.01 mol/L of 2-oxoglutaric acid (a molecular weight of 146.1) or potassium pyrosulfate (a molecular weight of 254.32) as a polymerization initiator are dissolved. In the case where the droplet size of the outer coating liquid 42 is made large, the viscosity of the outer coating liquid 42 may be increased by adding a thickening agent. A droplet of the outer coating liquid 42 is irradiated with ultraviolet rays, whereby a polymerization reaction is triggered and a capsule including an outer coating made of the first network gel is formed. After the capsule, which includes the outer coating made of the first network gel, is immersed in an aqueous solution in which 5 mol/L of acrylamide (a molecular weight of 71.08), 0.025 mol/L of N,N'-methylene-bis(acrylamide) (a molecular weight of 154.17) as a crosslinking agent, and 0.025 mol/L of 2-oxoglutaric acid (a molecular weight of 146.1) or potassium pyrosulfate (a molecular weight of 254.32) as a polymerization initiator are dissolved, the capsule is irradiated with ultraviolet rays, whereby a second network is formed and the heat storage capsule 10 is formed so as to include the outer sub-coating 26 using the double-network gel having the interpenetrating polymer network structure. Since the double-network gel is used for the outer sub-coating 26, the heat storage capsule 10 can prevent the breakage of the outer sub-coating 26 even if the outer sub-coating 26 is deformed under a relatively large load.

A nano-composite gel may be used for the outer sub-coating 26 of the heat storage capsule 10. The nano-composite gel is formed by adding a clay mineral (clay) in the course of polymerizing N-isopropylacrylamide and has high strength (high toughness). In the case using the nano-composite gel for the outer sub-coating 26, for example, a clay mineral such as montmorillonite is added to and dispersed in an aqueous solution in which 2 mol/L of an N-isopropylacrylamide monomer (a molecular weight of 113.16), 0.01 mol/L of sodium polyacrylate (a molecular weight of 94.04) as an ionizer, and 0.2 mol/L of N,N'-methylene-bis(acrylamide) (a molecular weight of 154.17) as a crosslinking agent are dissolved. Next, 0.0025 mol/L of ammonium persulfate (a molecular weight of 228.20) as a polymerization initiator and 0.001 mol/L of N,N,N',N'-tetramethylethylenediamine (a molecular weight of 116.2) as a polymerization promoter are added to the aqueous solution, followed by stirring. A droplet of the outer coating liquid 42 is irradiated with ultraviolet rays, whereby a polymerization reaction is triggered and the outer sub-coating 26 using the nano-composite gel is formed. Since the nano-composite gel is used for the outer sub-coating 26, the heat storage capsule 10 can prevent the breakage of the outer sub-coating 26 even if the outer sub-coating 26 is deformed under a relatively large load.

In the heat storage member 15 according to the third embodiment, the heat storage capsules 10 may be dispersed in the double-network gel. In this case, the heat storage capsules 10 are dispersed in an aqueous solution in which 2 mol/L of a 2-acrylamido-2-methylpropanesulfonic acid monomer (a molecular weight of 229.23), 0.2 mol/L of N,N'-methylene-bis(acrylamide) (a molecular weight of 154.17) as a crosslinking agent, and 0.01 mol/L of 2-oxoglutaric acid (a molecular weight of 146.1) or potassium pyrosulfate (a molecular weight of 254.32) as a polymerization initiator are dissolved. The aqueous solution is irradiated with ultraviolet rays, whereby a polymerization reaction is triggered and the first network gel is formed. After the first network gel is immersed in an aqueous solution in which 5 mol/L of acrylamide (a molecular weight of 71.08), 0.025 mol/L of N,N'-methylene-bis(acrylamide) (a molecular weight of 154.17) as a crosslinking agent, and 0.025 mol/L of 2-oxoglutaric acid (a molecular weight of 146.1) or potassium pyrosulfate (a molecular weight of 254.32) as a polymerization initiator are dissolved, the first network gel is irradiated with ultraviolet rays, whereby the second network gel is formed. The double-network gel in which the heat storage capsules 10 are dispersed is sealed in the container 81, whereby the heat storage member 15 in which the heat storage capsules 10 are dispersed in the double-network gel is produced. The heat storage member 15 can protect the heat storage capsules 10 with the double-network gel, which has high strength (high toughness), and therefore can prevent the breakage of the heat storage capsules 10.

In the heat storage member 15, heat storage capsules 12 according to the second embodiment may be dispersed in the double-network gel. The heat storage member 15 can protect the heat storage capsules 12, which each include the capsule coating 52 made of the sodium alginate gel or the methoxyl pectin gel, with the double-network gel, which has high strength (high toughness), and therefore can prevent the breakage of the heat storage capsules 12.

In the heat storage member 15 according to the third embodiment, the heat storage capsules 10 may be dispersed in the nano-composite gel. In this case, for example, a clay mineral such as montmorillonite is added to and dispersed in an aqueous solution in which 2 mol/L of an N-isopropylacrylamide monomer (a molecular weight of 113.16), 0.01 mol/L of sodium polyacrylate (a molecular weight of 94.04) as an ionizer, and 0.2 mol/L of N,N'-methylene-bis(acrylamide) (a molecular weight of 154.17) as a crosslinking agent are dissolved. Next, the heat storage capsules 10 are dispersed in the aqueous solution. Next, 0.0025 mol/L of ammonium persulfate (a molecular weight of 228.20) as a polymerization initiator and 0.001 mol/L of N,N,N',N'-tetramethylethylenediamine (a molecular weight of 116.2) as a polymerization promoter are added to the aqueous solution, followed by stirring. The aqueous solution is irradiated with ultraviolet rays, whereby a polymerization reaction is triggered and the nano-composite gel is formed. The nano-composite gel in which the heat storage capsules 10 are dispersed is sealed in the container 81, whereby the heat storage member 15 in which the heat storage capsules 10 are dispersed in the double-network gel is produced. The heat storage member 15 can protect the heat storage capsules 10 with the nano-composite gel, which has high strength (high toughness), and therefore can prevent the breakage of the heat storage capsules 10. Incidentally, a step of dispersing the heat storage capsules 10 in the aqueous solution is preferably performed before the aqueous solution is irradiated with ultraviolet rays.

In the heat storage member 15, heat storage capsules 12 according to the second embodiment may be dispersed in the nano-composite gel. The heat storage member 15 can protect the heat storage capsules 12, which each include the capsule coating 52 made of the sodium alginate gel or the methoxyl pectin gel, with the nano-composite gel, which has high strength (high toughness), and therefore can prevent the breakage of the heat storage capsules 12.

The heat storage material 20 in the heat storage capsule 10 or 20 may contain a supercooling prevention agent or a melting-point adjuster as required.

Items described in the detailed description, particularly items described in the embodiments, can be used in combination.

The heat storage capsules according to the above embodiments and the heat storage member using the same are expressed, for example, as follows.

(Appendix 1)

The heat storage capsule 10 or 12 includes the heat storage material 20 reversibly changing into a hydrate of a salt and an aqueous solution of the salt and also includes a capsule coating 22 or 52, respectively, encapsulating the heat storage material 20.

The heat storage capsule 10 or 12 can be readily produced. The heat storage capsule 10 or 12 is easy to handle.

(Appendix 2)

In the heat storage capsule 10 or 12 specified in Appendix 1, the capsule coating 22 or 52 has an inside diameter of about 1 mm to about 15 mm.

The heat storage capsule 10 or 12 can prevent the phase separation caused by the repetitive incongruent melting of the hydrate of the salt.

(Appendix 3)

In the heat storage capsule 10 specified in Appendix 1 or 2, the capsule coating 22 includes the inner sub-coating 24 covering the heat storage material and the outer sub-coating 26 covering the inner sub-coating 24.

The heat storage capsule 10 can prevent the outer sub-coating 26 from being dissolved.

(Appendix 4)

In the heat storage capsule 10 specified in Appendix 3, the inner sub-coating 24 is a hydrogenated oil layer and the outer sub-coating 26 is made of a calcium alginate gel.

The heat storage capsule 10 can prevent the outer sub-coating 26 from being dissolved.

(Appendix 5)

In the heat storage capsule 12 specified in Appendix 1 or 2, the capsule coating 52 is made of a calcium alginate gel.

The heat storage capsule 12 may have a two-layer structure.

(Appendix 6)

In the heat storage capsule 10 or 12 specified in any one of Appendixes 1 to 6, the salt is sodium sulfate, disodium hydrogen phosphate, sodium thiosulfate, sodium acetate, or calcium chloride.

In the heat storage capsule 10 or 12, the hydrate of the salt, which is safe and inexpensive, can be used for the heat storage material 20.

(Appendix 7)

The heat storage member 11 includes the containers 21 and 23 and a plurality of heat storage capsules 10 or 12, specified in any one of Appendixes 1 to 6, filled in the containers 21 and 23.

The inside size of the heat storage member 11 need not be adjusted to 6 mm in the gravitational direction of the containers; hence, the degree of freedom in placement can be increased.

(Appendix 8)

The heat storage member 15 includes the container 81, the paraffin 80 filled in the container 81, and a plurality of heat storage capsules 10 or 12 specified in any one of Appendixes 1 to 6, dispersed in the paraffin 80.

The heat storage member 15 can prevent the drying of the heat storage capsules 10 or 12.

INDUSTRIAL APPLICABILITY

The present invention can be widely used in heat storage capsules filled with a hydrate and heat storage member using the same.

REFERENCE SIGNS LIST 10, 12 Heat storage capsule(s)
11 Heat storage member
20 Heat storage material
21, 23, 81 Container(s)
22, 52 Capsule coating
24 Inner sub-coating
26 Outer sub-coating 28 Crystals of hydrate
30 Aqueous solution of salt
32 Lower hydrate, anhydride
40 Triple nozzle
40a, 40b, 40c, 60a, 60b Sub-nozzle
42, 62 Outer coating liquid
44 Inner coating liquid
48 Preparation vessel
50 Cooling liquid
60 Double nozzle
64 Aqueous calcium chloride solution
70 Single nozzle
72 Aqueous calcium chloride solution
74 Aqueous sodium alginate solution
80 Paraffin
82 Oleophilic portion

The invention claimed is:

1. A heat storage member comprising:
a container;
a double-network gel or a nano-composite gel filled in the container; and
a plurality of heat storage capsules which are dispersed in the double-network gel or the nano-composite gel and which each include a heat storage material reversibly changing into a hydrate of a salt and an aqueous solution of the salt and a capsule coating encapsulating the heat storage material; wherein
the double-network gel includes an interpenetrating polymer network structure in which network structures made of different materials are physically intertwined with each other,
the nano-composite gel is defined by a polymer cross-linked with inorganic nanoparticles,
the capsule coating includes an inner sub-coating covering the heat storage material and an outer sub-coating covering the inner sub-coating,
the inner sub-coating is a hydrogenated oil layer and the outer sub-coating is made of a calcium alginate gel.

2. A heat storage member comprising:
a container;
a double-network gel or a nano-composite gel filled in the container; and
a plurality of heat storage capsules which are dispersed in the double-network gel or the nano-composite gel and which each include a heat storage material reversibly changing into a hydrate of a salt and an aqueous solution of the salt and a capsule coating encapsulating the heat storage material; wherein
the double-network gel includes an interpenetrating polymer network structure in which network structures made of different materials are physically intertwined with each other,
the nano-composite gel is defined by a polymer cross-linked with inorganic nanoparticles,
the capsule coating includes an inner sub-coating covering the heat storage material and an outer sub-coating covering the inner sub-coating,
the inner sub-coating is made of a double-network gel.

3. A heat storage member comprising:
a container;
a double-network gel or nano-composite gel filled in the container; and
a plurality of heat storage capsules which are dispersed in the double-network gel or the nano-composite gel and which each include a heat storage material reversibly changing into a hydrate of a salt and an aqueous solution of the salt and a capsule coating encapsulating the heat storage material; wherein
the double-network gel includes an interpenetrating polymer network structure in which network structures made of different materials are physically intertwined with each other,
the nano-composite gel is defined by a polymer cross-linked with inorganic nanoparticles,
the capsule coating includes an inner sub-coating covering the heat storage material and an outer sub-coating covering the inner sub-coating,
the outer sub-coating is made of a nano-composite gel.

* * * * *